United States Patent [19]

Whitener

[11] Patent Number: 4,565,595
[45] Date of Patent: Jan. 21, 1986

[54] METHOD OF MAKING COMPOSITE AIRCRAFT WING

[75] Inventor: Philip C. Whitener, Seattle, Wash.

[73] Assignee: The Boeing Company, Seattle, Wash.

[21] Appl. No.: 514,283

[22] PCT Filed: Jun. 6, 1983

[86] PCT No.: PCT/US83/00893
§ 371 Date: Jun. 6, 1983
§ 102(e) Date: Jun. 6, 1983

[87] PCT Pub. No.: WO84/04905
PCT Pub. Date: Dec. 20, 1984

Related U.S. Application Data

[63] Continuation-in-part of Ser. No. 333,247, filed as PCT US81/01319, Sep. 30, 1981, published as WO 83/01238, Apr. 14, 1983, § 102(e) date Sep. 30, 1981, Pat. No. 4,395,450.

[51] Int. Cl.$^4$ ............................ B64C 3/18; B32B 5/00
[52] U.S. Cl. ..................................... 156/156; 156/172; 156/182; 156/245; 244/123; 264/258
[58] Field of Search ............... 156/182, 245, 156, 172, 156/300, 304.2, 304.3; 264/258, 314, 363; 428/116, 110; 244/123, 124, 119, 120, 131

[56] References Cited

U.S. PATENT DOCUMENTS

| | | | |
|---|---|---|---|
| 2,754,915 | 7/1956 | Echeverria, Jr. | 244/124 |
| 3,641,230 | 2/1972 | Jenks | 156/156 |
| 3,771,748 | 11/1973 | Jones | 428/116 |
| 3,910,531 | 10/1975 | Leonard | 244/123 |
| 3,962,506 | 6/1976 | Dunahoe | 156/156 |
| 4,051,289 | 9/1977 | Adamson | 244/123 |
| 4,284,443 | 8/1981 | Hilton | 156/182 |
| 4,344,995 | 8/1982 | Hammer | 241/131 |
| 4,395,450 | 7/1983 | Whitener | 244/123 |

Primary Examiner—Michael Ball
Attorney, Agent, or Firm—Morris A. Case; Bernard A. Donahue

[57] ABSTRACT

A pair of specially reinforced skin-spar joints in combination with a honeycomb core are used to build up a wing spar for a composite airplane wing. A series of contoured mandrels with a covering of fuel resistant material and a wrapped reinforced plastic are aligned one above the other. The wing spar materials are placed between the mandrels, honeycomb core is located alongside as well as wing skins to form a wing buildup. The buildup is placed in a mold, pressure applied to each mandrel forcing all the parts together, and the buildup heated to cure the resins and form a composite wing structure.

8 Claims, 16 Drawing Figures

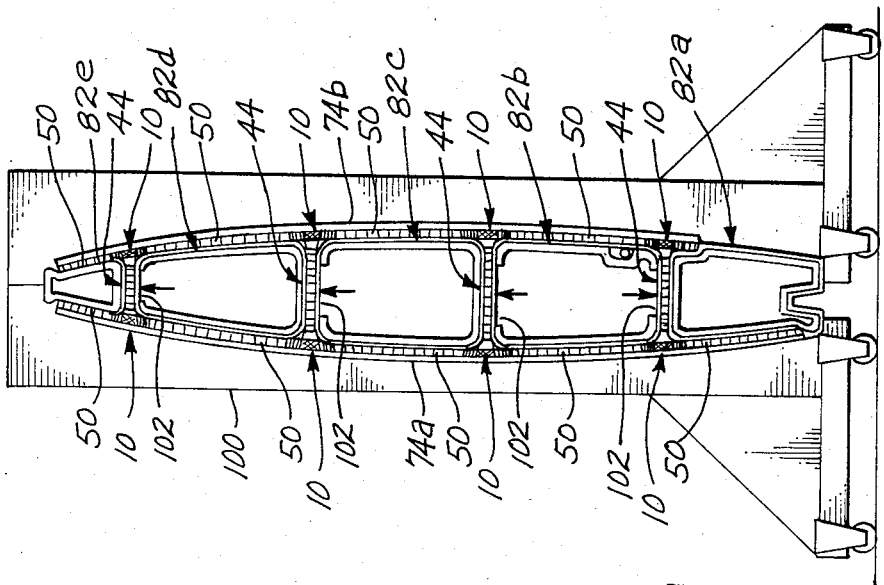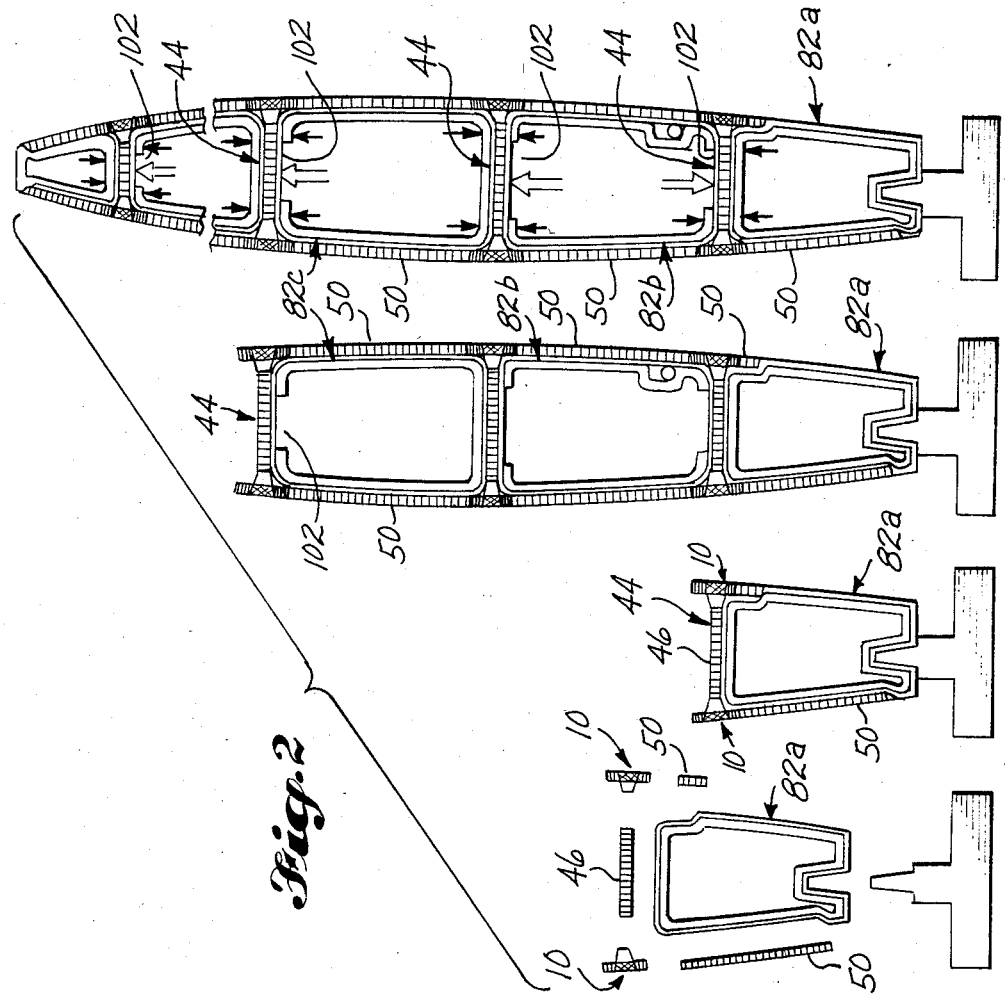

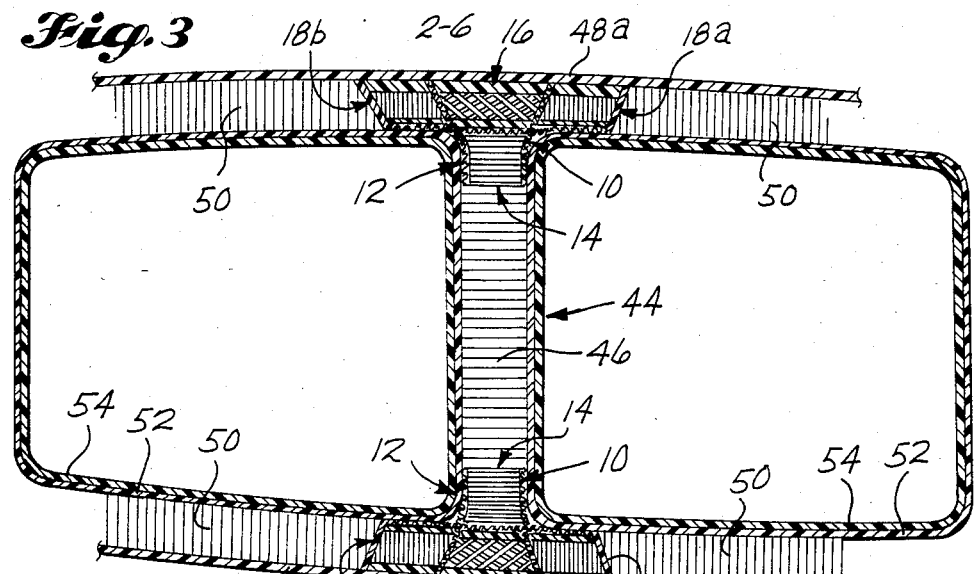
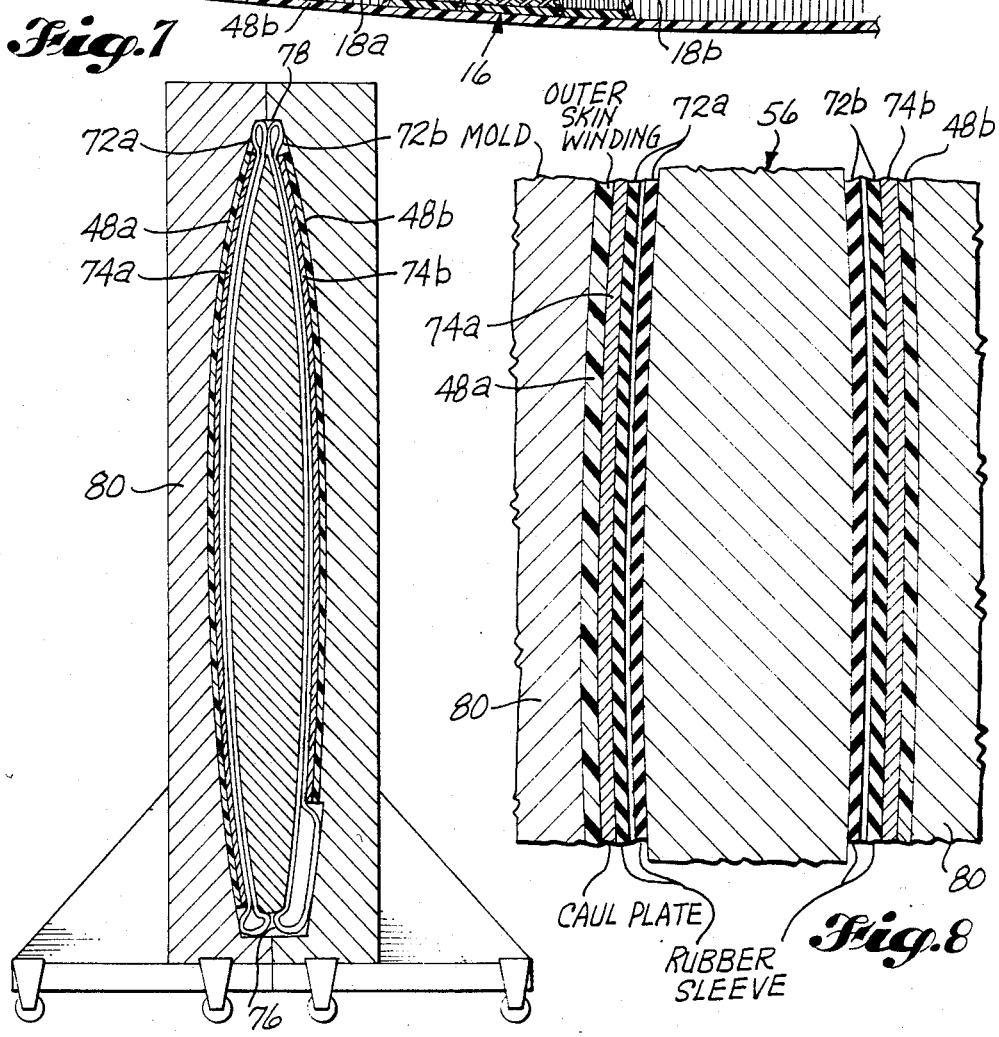

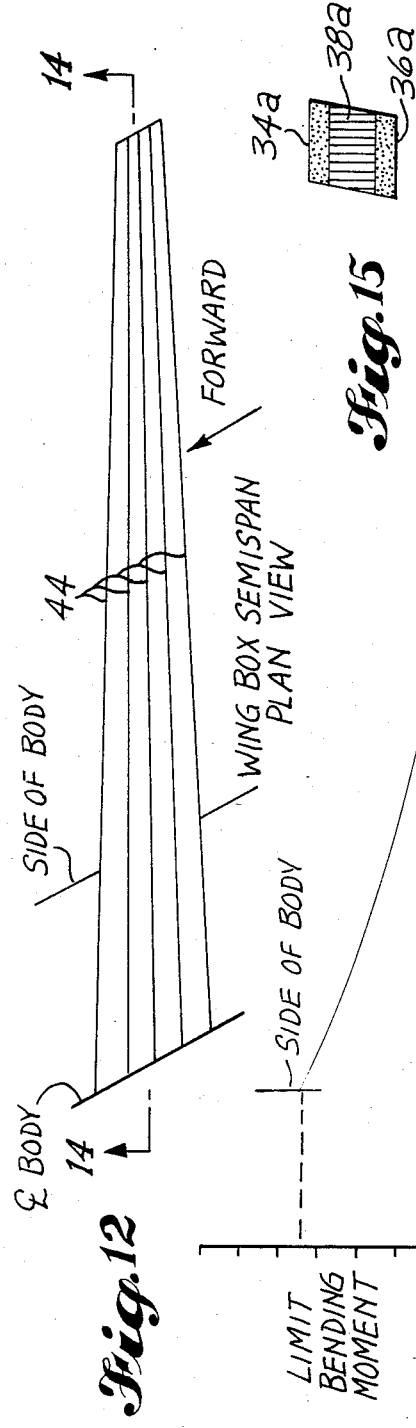
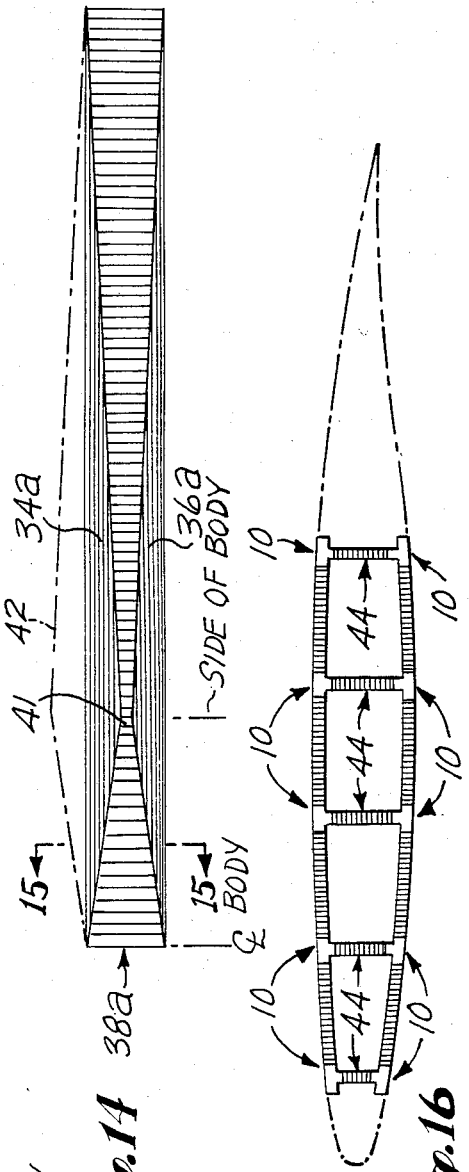

METHOD OF MAKING COMPOSITE AIRCRAFT WING

This is a continuation-in-part of application Ser. No. 333,247 filed as PCT US 81/01319 on Sept. 30, 1981, published as WO 83/01238, Apr. 14, 1983, § 102(e) date Sept. 30, 1981 now U.S. Pat. No. 4,395,450.

BACKGROUND OF THE INVENTION

The high strength to weight ratio of composite components make the composites attractive for use on airplanes. However, the joints between composite components involve one of the most difficult problems of adapting the composites to the manufacture of airplanes. These problems are severely multiplied when the joints are highly stressed in several directions. It was found that a composite skin-spar joint could be prepared that not only lends itself to providing a low weight high strength joint for any composite, but it is particularly attractive for use in aircraft wings. The joint when integrated makes spars that carry the loads without the need for ribs.

SUMMARY OF THE INVENTION

A composite aircraft wing has an integral skin-spar joint that has a resin impregnated interwoven fabric with a pair of spaced apart spanwise extending panels, and a bisecting laterally extending interwoven panel that extends laterally to each side. Three cores are joined to one side of the laterally extending panel. The intermediate core extends between and is joined to the spaced apart panels, and has directional reinforcement to handle torsional loads. The other two cores have reinforcement to handle varying loads in a spanwise direction. A fourth core is located adjacent to the intermediate core and is joined to the three panels. The skin-spar joints in combination with a honeycomb core are used to make up spars for a composite aircraft wing. The wing is formed with a series of shaped mandrels each wrapped with reinforced plastic and the mandrels aligned in spaced relation one above the other with spar materials between mandrels, and honeycomb core and reinforced plastic skins alongside the mandrels all curved into a composite wing.

DESCRIPTION OF THE DRAWINGS

FIG. 1 shows a cross-sectional end view of the buildup of the composite wing of this invention mounted in a mold.

FIG. 2 shows cross-sectional end views of various stages of buildup of the wing of FIG. 1.

FIG. 3 shows a blow up of a fragmented section of the wing of FIG. 1.

FIG. 7 is a cross-sectional view taken along lines 7—7 of FIG. 6 and showing the covered mandrel in a mold and ready for curing.

FIG. 8 is a blown up fragmented view of FIG. 7.

FIG. 12 shows a schematic plan view of the spars of the composite aircraft wing.

FIG. 13 is a graph showing the wing bending movement for the wing of FIG. 12.

FIG. 14 shows a side elevational view of one of the chords, without a cover layer, making up a skin-spar joint.

FIG. 15 is a cross-sectional view taken along line 15—15 of FIG. 14.

FIG. 16 shows a cross-sectional side elevational view of skin-spar joints in a wing of an aircraft.

DETAILED DESCRIPTION

Figure 11:
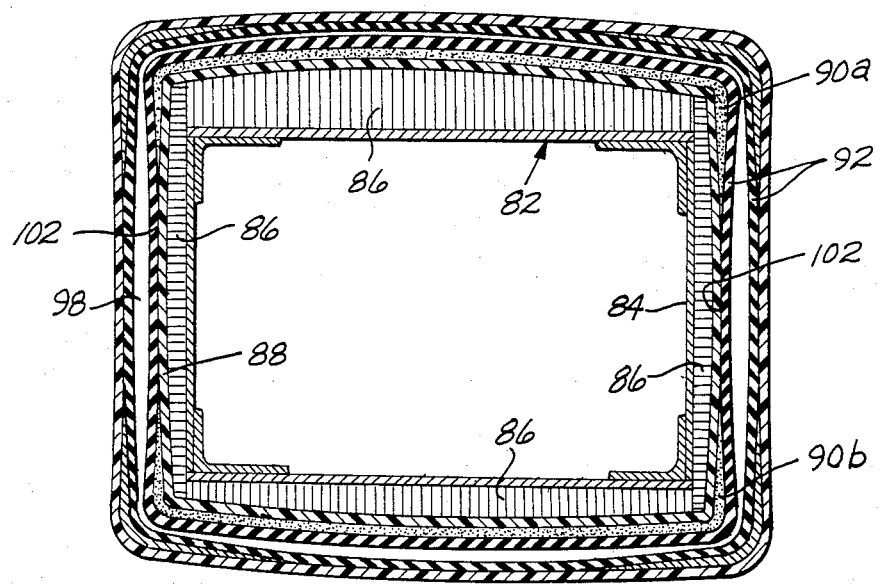
FIG. 11 is a cross-sectional view taken along lines 11—11 of the mandrel of FIG. 10.

Composite skin-spar joint 10, is made up of resin impregnated interwoven fabric 12, cores 14, and 16, and chords 18a and 18b.

The interwoven fabric 12 is prepared from any of the known reinforcing fibers such as, but not limited to, fiberglass and graphite, and will be impregnated with any of the known resins, such as but not limited to, phenolic or epoxy resin. The impregnated fabric extends for the length of the desired span for the joint, is essentially H-shaped in cross section, and has fiber orientation that is predominately transverse. The fabric has a panel 20 that extends laterally and is bisected at 22a and 22b where it is interwoven with a pair of spaced apart panels 24a and 24b. The two spaced apart panels preferably have the spacing increase as the panels extend outward.

Core 14 is directly in contact with all three layers of the fabric, is located in the web area, and is preferably of a honeycomb material. A plastic potting compound 26 is preferably used between the core and panel 20.

On the opposite side of panel 20 and in contact with all the panels is an intermediate core 16; which is a fabricated core. It has a center 28 of honeycomb; which is aligned in a crisscrossing pattern to resist shear due to lateral bending, and an optional reinforced plastic top layer 30a and a bottom layer 30b. A covering 32 of a resin impregnated wound fiber may be used.

Chords 18a and 18b are located to the right and left of the intermediate core 16, and are fabricated chords. Those chords respectively have top layer 34a and 34b and bottom layer 36a and 36b; which are each made from reinforced plastics and are precured before assembly. There are honeycomb cores 38a and 38b between the layers and the cores have a wrapping 40a and 40b of resin impregnated reinforcing fibers. Various materials can be used to prepare the cores and the chords, however, the preferred material for the honeycomb is a glass fiber treated with a heat resistant phenolic resin, and the preferred reinforcement is graphite and the preferred resin is an epoxy. These chords are prepared in a manner to vary the load bearing capacity along the length of the span. FIGS. 14 and 15 show a build up of chord 18a. First, the bottom layer 36a is laid up using epoxy resin impregnated graphite fibers that are oriented in a zero direction or, in other words, in a spanwise direction. The thickness of the layer is varied to be the thickest at the point of greatest load 41; which is at the side of the body. Next, honeycomb 38a is placed on the bottom layer and secured there by setting up the resin in the layer. When thus joined the honeycomb extends along the phantom line 42.

The honeycomb is then machined to shape. Next, a matching shaped top reinforced layer 34a is placed on top of the machined honeycomb, and the resin impregnated reinforcing fibers 40a, not shown in FIGS. 14 and 15, are wrapped around it to make up the chords having constant outside dimensions, but varying load bearing properties in the spanwise direction. It is desirable at a wing joint to redistribute the spar chords into the skin. This is accomplished by the bond between the spar chord and the skin. As the load is transferred the number of fibers in the chords are reduced until all the load is distributed into the skin at station 0 (FIG. 13).

FIG. 16 shows the skin-spar joint for use in an airplane wing. In that figure joints 10 are used top and bottom in making up spars 44. FIG. 12 shows a schematic plan view of the same wing with the five spars 44 extending to the centerline of the body of the airplane, and FIG. 13 shows a graph of the bending moment for the wing of FIG. 12.

Figure 4:
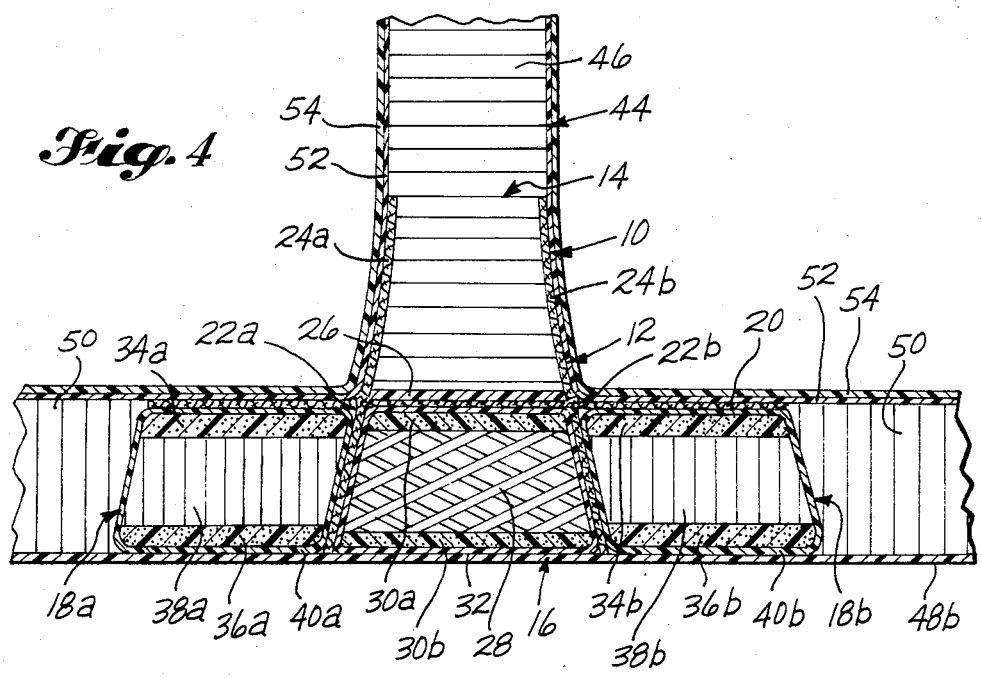
FIG. 4 shows a fragmented view of a further blowup of FIG. 3 showing more detail of the skin-spar joint of this invention.

FIGS. 3 and 4 show the skin-spar joint 10 in a typical joint with a spar web core 46 of nonmentallic honeycomb, reinforced plastic wing face skins 48a and 48b, adjoining nonmetallic honeycomb core 50, and a cell of reinforced plastic 52 with a fuel resistant plastic liner 54. The wing skin may be of light weight metal, but a reinforced plastic wing skin is preferred.

Figure 5:
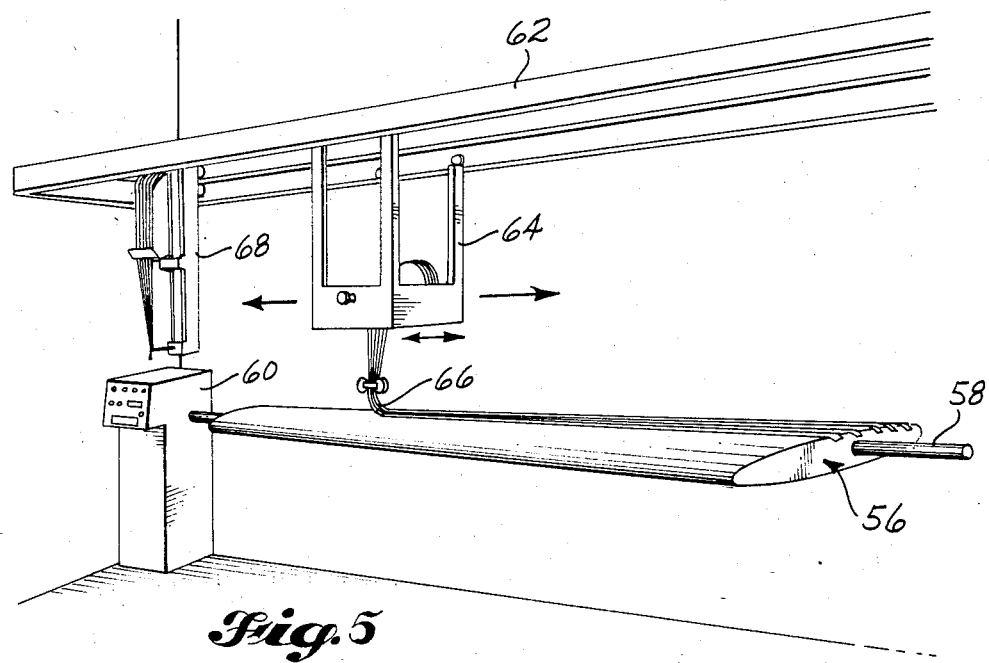
FIGS. 5 and 6 are perspective views showing the layup of wing skins for this invention.
Figure 6:
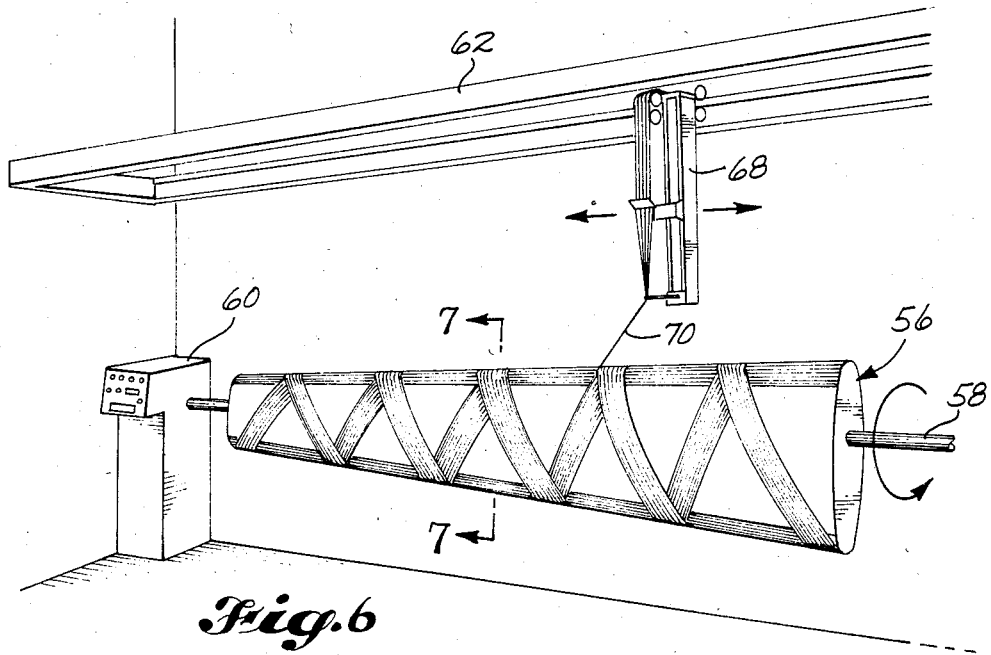

The reinforced plastic wing skin is preferably laid up as is shown in FIGS. 5 and 6 where a mandrel 56, mounted on shaft 58 is actuated by control unit 60. The fibers are laid up by use of overhead support 62 to which two types of movable dispensers are mounted. The first dispenser 64, is used to lay down resin impregnated nonmetallic reinforcing fibers arranged as a tape 66. These tapes are laid down essentially in a zero direction lengthwise of the mandrel. The second dispenser 68, is used to lay down resin impregnated nonmetallic reinforcing fibers 70, by winding around the mandrel. Each of the dispensers, as well as the mandrel, are programmed by the control unit 60 to give the desired layup for the wing skin.

The mandrel is covered by a pair of double sided air bags 72a and 72b which in turn have a caul plate 74a and 74b secured to the outer surface of the bags. See FIGS. 7 and 8. These air bags and caul plates are secured to the mandrel before the fibers are wrapped. The wrapped fibers are cut near the leading edge 78, and the trailing edge 76 of the wing, and placed in a mold 80 along with the mandrel. Pneumatic pressure is then applied to the two air bags forcing the wing skins against the contoured mold, and the skin is formed at resin curing temperatures.

Figure 9:
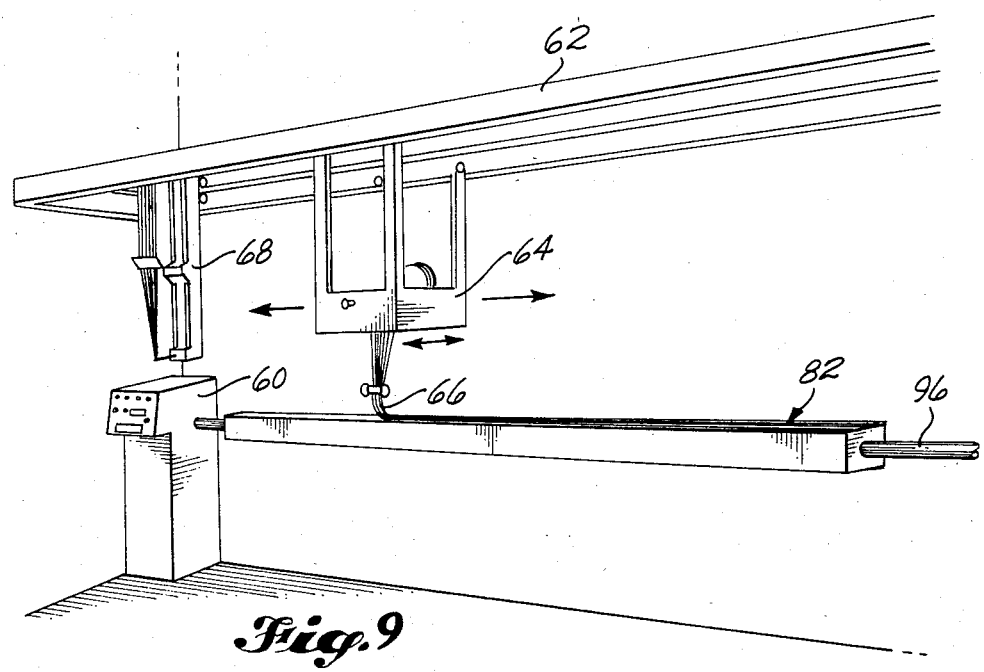
FIGS. 9 and 10 are perspective views showing the layup of reinforced plastic on a mandrel for the cell liner of a wing.
Figure 10:
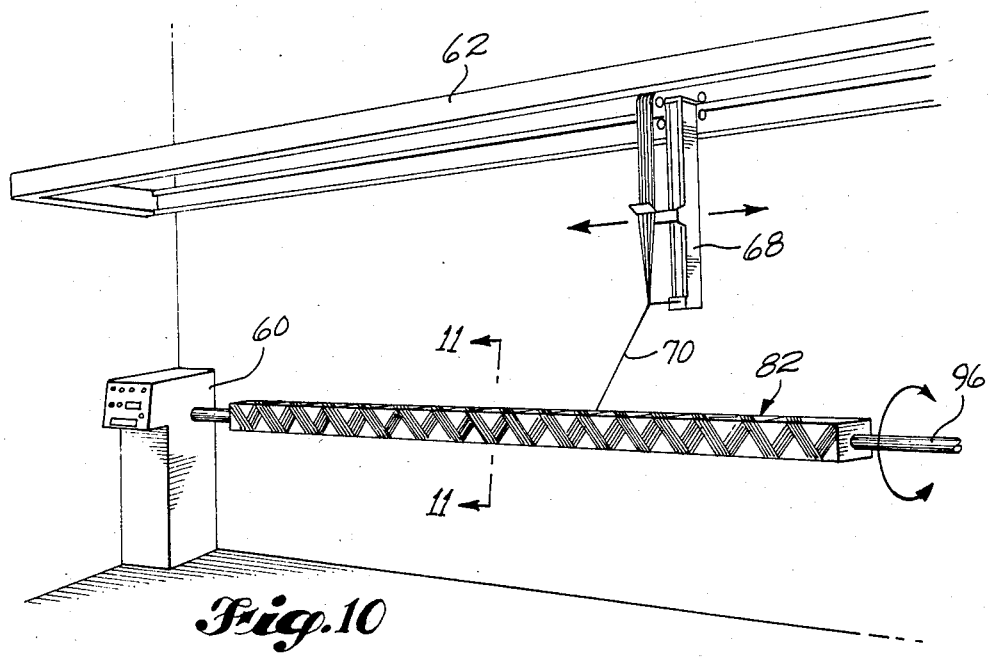

The cells are formed using a series of mandrels 82, each individually contoured. These mandrels, as are best shown in FIG. 11, have a primary structure 84 of welded steel, a surrounding, secured and contoured honeycomb 86, a reinforced fiber layer 88, a shaped composite spacer 90 having two sections 90a and 90b, a double layered air bag 92, and a set of four shaped caul plates 94a, 94b, 94c and 94d arranged at the corners. The mandrel is mounted by shaft 96 to control unit 60, plastic liner 54 placed over the mandrel, and reinforced plastic covering 52 laid up with unidirectional layers of tape and wrapped layers of fibers using dispensers 64 and 68 and control unit 60, see FIGS. 9 and 10. Before laying up covering 52, pressure is introduced into the space 98 in the air bag 92. This pressure in combination with the wrapping by dispenser 68 controls the perimeter of the layup.

In preparing a composite wing the wrapped contoured mandrels 82, for the cells are aligned in a spaced apart arrangement one above the other with a honeycomb core 46 and a pair of skin-spar joints 10, making up a spar 44 arranged between the adjacent mandrels. Honeycomb cores 50 are located alongside each mandrel and between the skin-spar joints. The formed wing skins 74a and 74b are placed along each side, and the complete buildup located in a mold 100, where it is subjected to pressure in each of the mandrels to force the parts together and the skin against the mold. The formed buildup is then heated to resin cure temperatures, and the buildup is cured into a composite wing. In the construction of the mandrel the composite spacers 90a and 90b, see FIG. 11, have gaps 102 at two ends, which provide a relief at each of those gaps. The relief eliminates load on the spar core 46, during buildup of the composite wing by shifting the loads to the more dense skin-spar joints 10. Each mandrel may differ as to providing relief. Preferably the mandrels are as shown in FIG. 1 where the ends or top and bottom mandrels 82a and 82e do not have any provisions for relief, mandrel 82b provides relief at top and bottom, and mandrels 82c and 82d each have provided for relief on the top. The inflation pressure in the various mandrels is also preferably varied with the pressure higher on the side of the spar bracing a relief. Typical pressures are as follows:

| Mandrel No. | P.S.I. |
| --- | --- |
| 82a | 55.00 |
| 82b | 56.06 |
| 82c | 55.74 |
| 82d | 55.42 |
| 82e | 47.00 |

I claim:

1. A method of preparing a contoured composite structure, with steps comprising: wrapping resin impregnated nonmetallic reinforcing fibers around a plastic covering on each of a series of individually contoured elongated mandrels, arranging the wrapped mandrels in a line and in spaced relation to each other, locating a pair of reinforced load bearing joints and a honeycomb core at each spacing between wrapped mandrels, placing honeycomb core between the load bearing joints along the sides of the wrapped mandrels, covering the sides with a preformed reinforced skin, establishing the outside contour of the skin by placing the built up composite structure in a mold and introducing pneumatic pressure around each mandrel forcing all parts together in the mold, and curing into a contoured composite structure.

2. A method of preparing a contoured composite structure as in claim 1, with further steps comprising: introducing pneumatic pressure around the mandrels during the wrapping of the mandrels.

3. A method of preparing a contoured composite structure as in claim 2 with further steps comprising: wrapping the resin impregnated reinforcing fibers around the mandrel by laying tape longitudinally and winding fibers around the plastic covering the mandrel, and continuously controlling the periphery of the wrapping by controlling the pneumatic pressure around each mandrel.

4. A method of preparing a composite aircraft wing comprising: utilizing an air bag on each of a series of elongated contoured mandrels, encasing each mandrel in a fuel resistant plastic liner, introducing pneumatic pressure into each air bag, laying a resin impregnated nonmetallic reinforcing material over the plastic liner, arranging the covered mandrels in a line and spaced apart from each other, laying up a pair of elongated reinforced load bearing wing spar joints and a honeycomb core between adjacent covered mandrels, locating a honeycomb core along side each mandrel and between wing spar joints, covering the outside with a skin, locating the arranged components in a mold, forcing the component parts together by introducing pneumatic pressure into the air bags, and curing into a composite wing structure.

5. A method of preparing a composite aircraft wing as in claim 4 with further steps comprising: laying up the resin impregnated material over the plastic liner with longitudinally extending reinforced tape and wrapping reinforcing filaments around the mandrel, and controlling the periphery of the lay up by controlling tension on the filaments and controlling pressure in the air bags during the winding.

6. A method of preparing a composite aircraft wing as in claim 4, with further steps comprising: arranging the mandrels in a vertical line for building up and for curing the composite, providing a relief in at least one adjacent side in each of the intermediate mandrels for placing lay up pressure on the wing spar joint part of each spar during layup, providing higher pneumatic pressure to the air bags of the mandrels on the side of a spar bracing a relief.

7. A method of preparing a composite aircraft wing as in claim 5 with further steps comprising: locating caul plates between the air bags and the plastic liner at each corner of the mandrel prior to laying up the resin impregnated reinforcing material.

8. A method of preparing a composite aircraft wing as in claim 4, with further steps comprising: placing layers of resin impregnated nonmetallic reinforced tape longitudinally over a wing shaped mandrel, wrapping layers of resin impregnated nonmetallic filaments over the wing shaped mandrel and forming a wing skin, locating the wrapped mandrel in a mold, cutting the laid up fibers along the leading and trailing edges of the wing shaped mandrel, introducing pneumatic pressure into air bags on the mandrel for pushing caul plates against the laid up fibers and forcing them against the mold surface, and curing to form upper and lower wing surfaces.

* * * * *